(12) United States Patent
Pai

(10) Patent No.: US 6,880,773 B2
(45) Date of Patent: Apr. 19, 2005

(54) SHUT DEVICE FOR A DISCHARGE OUTLET IN A GRINDER

(76) Inventor: Chung-Jen Pai, 1F, No. 83, Lane 26, Chung Hsiao Street, Chung Ho, Taipei Hsien (TW)

( * ) Notice: Subject to any disclaimer, the term of this patent is extended or adjusted under 35 U.S.C. 154(b) by 94 days.

(21) Appl. No.: 10/224,481

(22) Filed: Aug. 21, 2002

(65) Prior Publication Data

US 2004/0016836 A1 Jan. 29, 2004

(30) Foreign Application Priority Data

Jul. 23, 2002 (TW) ..................................... 91211207 U

(51) Int. Cl.$^7$ ............................................. A47J 42/04
(52) U.S. Cl. .................................................. 241/169.1
(58) Field of Search .......................... 722/142.1–142.9; 241/168, 169, 169.1

(56) References Cited

U.S. PATENT DOCUMENTS

| | | | | |
|---|---|---|---|---|
| 3,130,927 A | * | 4/1964 | Schmieding | 241/169.1 |
| 4,231,527 A | * | 11/1980 | Bounds | 241/169.1 |
| 4,771,955 A | * | 9/1988 | Paulson | 241/169.1 |
| 4,960,246 A | * | 10/1990 | Fohrman | 241/169.1 |
| 5,709,346 A | * | 1/1998 | Bounds et al. | 241/169.1 |

* cited by examiner

Primary Examiner—Mark Rosenbaum
(74) Attorney, Agent, or Firm—Troxell Law Office, PLLC

(57) ABSTRACT

A shut device for a discharge outlet in a grinder is disposed at a bottom of the grinder and the shut device includes a stationary part and a rotary part. The stationary part has two concentric curved walls being opposite to each other symmetrically and each of the curved walls at an inner side protrudes a tenon next to an end thereof respectively. The rotary part is a step-shaped cap with an abrupt fitting ring corresponding to the two curved walls so as to fit with the two curved walls such that the top of the fitting ring can keep contact with the discharge outlet at the circumference thereof. The rotary part has an annular surface with two L-shaped guide grooves corresponding to the two tenons so that the tenons can be inserted into the guide grooves to form an engagement respectively. There are hollow openings and stop plates are alternately disposed at the center of rotary part to correspond three locating points of opening, shutting and detaching from the discharge outlets and three positioning projections being provided on the guide grooves in accordance with the three locating points. Once the rotary part is turned, the tenons can move along the guide grooves and engage with the locating points one at a time respectively such that the hollow openings can align with the discharge outlet for ground powder falling down or the stop plates close the discharge outlet for preventing the powder from falling down.

5 Claims, 3 Drawing Sheets

SHUT DEVICE FOR A DISCHARGE OUTLET IN A GRINDER

BACKGROUND OF THE INVENTION

1. Field of the Invention

The present invention relates to a shut device for a discharge outlet in a grinder, and particularly to a shut device is mounted to the discharge outlet of a grinder such that the ground powder can stay in the grinding device or the adjustment device in the grinder instead of spreading on the ground.

2. Description of Related Art

The powder grinder such as the pepper grinder can grind the particle pepper into powder and it is easy for eaters or cookers to directly spread the powder into food or soup conveniently. This is why the pepper powder is loved to use by eaters or cookers. The powder grinder mostly can be classified into manual type and electric type and the manual type grinder has an adjustment device for different grain sizes of the pepper to be disposed at the top of the grinder. But, it is hard for the adjustment deice to be adjusted due to being far from the grinding device at the bottom of the grinder. The present inventor has owned U.S. Pat. No. 5,865,384 entitled "SPICE GRINDER" to overcome the preceding deficiency of the conventional grinder. The U.S. Pat. No. 5,865,384 can be used manually or electrically with a feature that the adjustment device is located below the grinding device to displace a cone shaped grinding disk longitudinally and change the clearance between the grinding disk and the grinding seat so as to adjust the coarseness of the powder.

Although the preceding grinder can perform the basic functions of powder grinding job, the powder may stay at the clearance of the grinding device, support frame of the adjustment device or the discharge outlet. Once the grinder is place on a table or a kitchen cabinet, the powder in the grinder may fall down to the table or the kitchen to result in a trouble of cleaning afterward due to vibration in addition to being unpleasant to the eyes. Of course, the preceding shortcoming has been improved in a grinder available in the market. For instance, the grinder at the lower rim of the discharge outlet thereof axially connects with a cap to open or close the discharge outlet so as to avoid the deficiency mentioned above. However, the cap expands outward during the grinder being operated such that the ground powder may stay at the cap to result in being used inconveniently in addition to causing an abrupt vision to the eyes.

SUMMARY OF THE INVENTION

The crux of the present invention is to provide a shut device for a discharge outlet in a grinder is disposed at a bottom of the grinder and the shut device includes a stationary part and a rotary part. The stationary part has two concentric curved walls being opposite to each other symmetrically and each of the curved walls at an inner side protrudes a tenon next to an end thereof respectively. The rotary part is a step-shaped cap with an abrupt fitting ring corresponding to the two arctic walls so as to fit with the two walls such that the top of the fitting ring can keep contact with the discharge outlet at the circumference thereof. The rotary part has an annular surface with two L-shaped guide grooves corresponding to the two tenons so that the tenons can be inserted into the guide grooves to form an engagement respectively. There are hollow openings and stop plates are alternately disposed at the center of rotary part to correspond three locating points of opening, shutting and detaching from the discharge outlets and three positioning projections being provided on the guide grooves in accordance with the three locating points. Once the rotary part is turned, the tenons can move along the guide grooves and engage with the locating points one at a time respectively such that the hollow openings can align with the discharge outlet for ground powder falling down or the stop plates closed the discharge outlet for preventing the powder from falling down.

BRIEF DESCRIPTION OF THE DRAWINGS

The present invention can be more fully understood by reference to the following description and accompanying drawings, in which.

DETAILED DESCRIPTION OF THE PREFERRED EMBODIMENT

Figure 1:
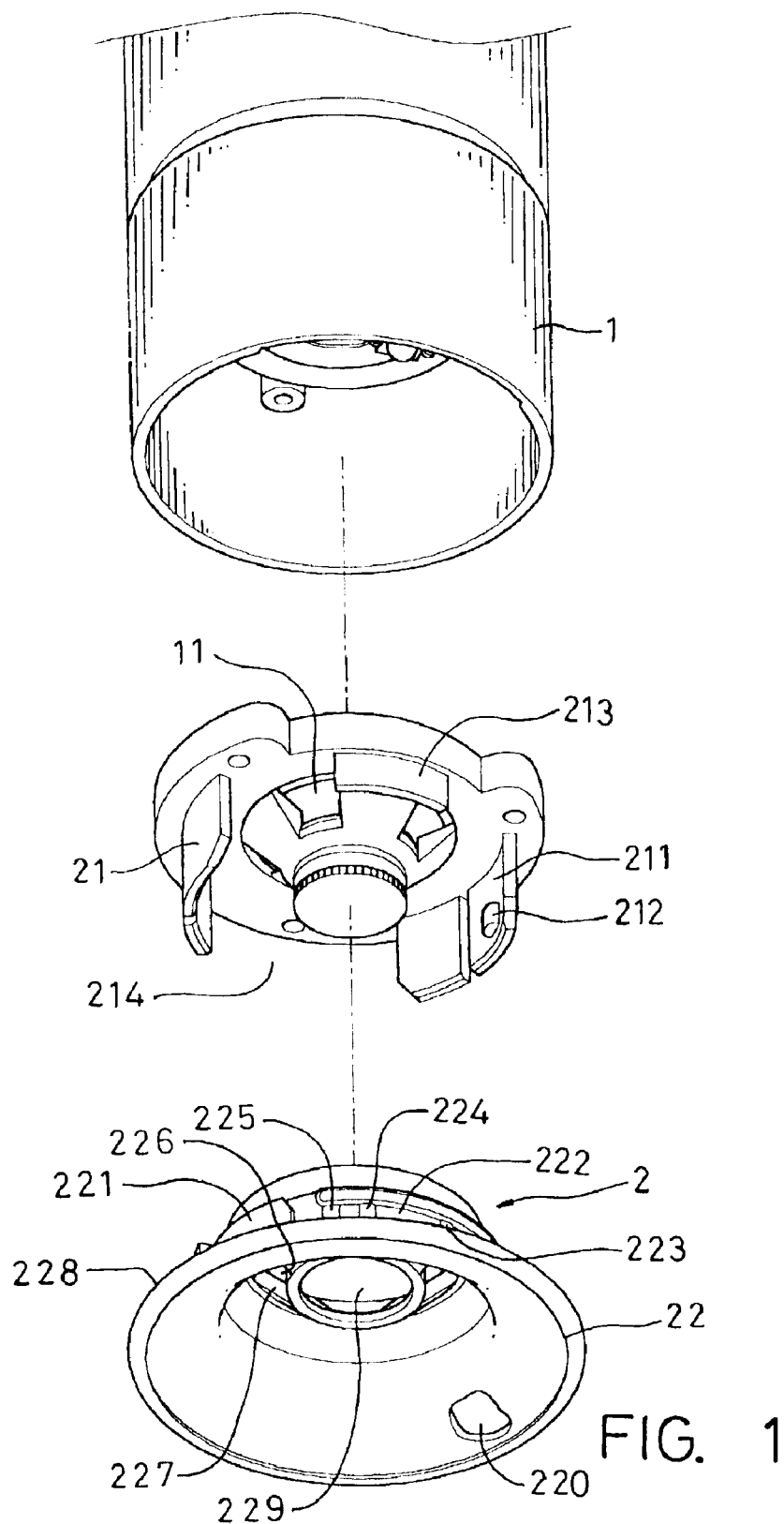
FIG. 1 is a perspective exploded view of a shut device for a discharge outlet in a grinder according to the present invention.

Referring to FIG. 1, a discharge shut device for a grinder according to the present invention is arranged at the discharge outlet 11 disposed at the bottom of grinder 1 and basically is comprised of a stationary part 21 and a rotary part 22.

Wherein, the stationary part 21 is provided surrounding the circumference of the discharge outlet 11 and extending downward two concentric curved walls 211 with each of the curved walls 211 at the inner side thereof having a tenon 212 respectively so that the rotary part 22 can fixedly fit with the curved walls 211. Besides, in order to support and limit the rotary part 22 in motion, a concentric curved support wall 213 and a spacing 214 are oppositely disposed between the arctic curved walls 211 with the arctic support wall 213 being shorter than the curved walls.

Figure 2B:
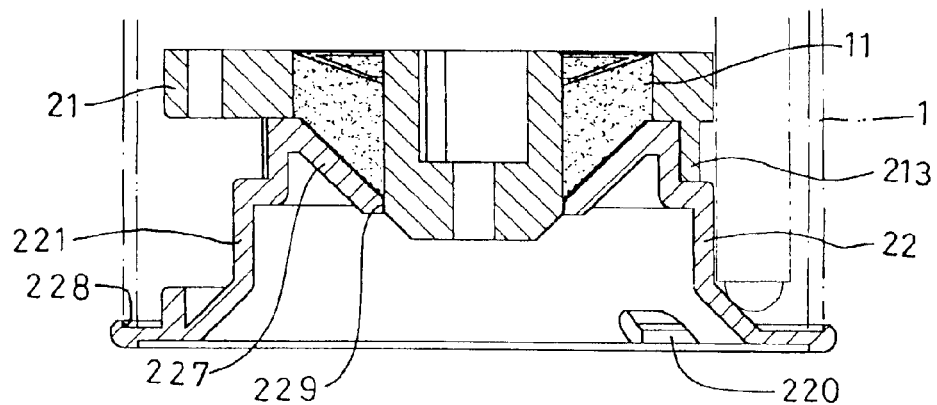
FIGS. 2A and 2B are a bottom view and a sectional view of the shut device shown in FIG. 1 illustrating the shut device in a state of shutting.
Figure 2A:
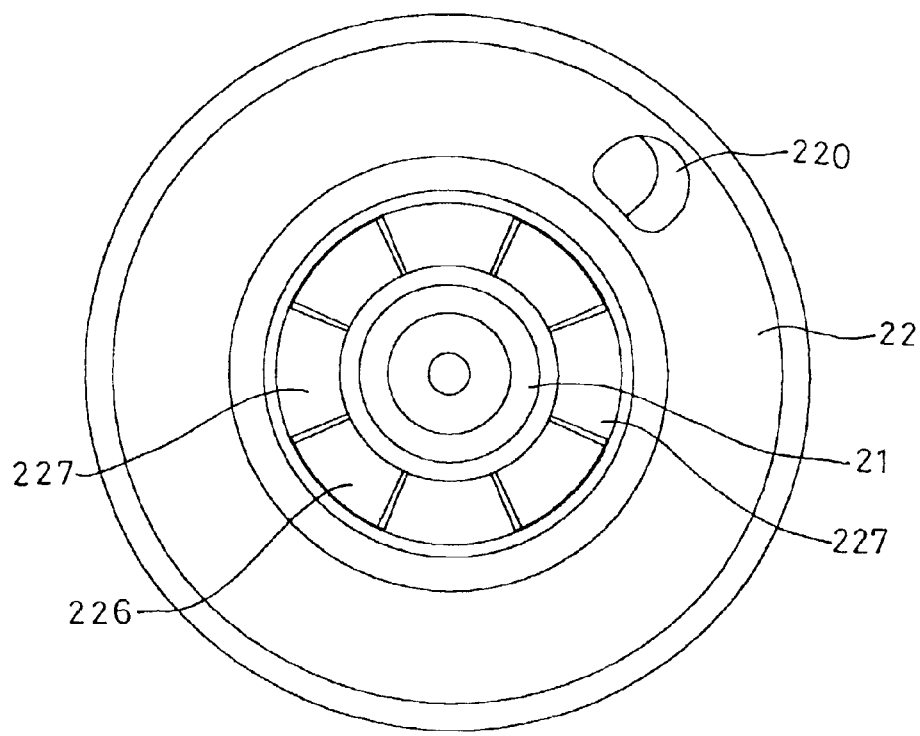
Figure 3B:
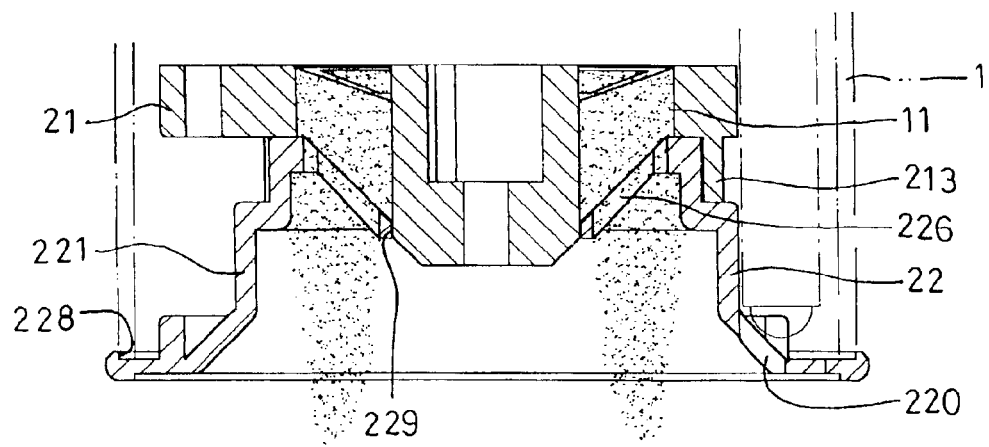
FIGS. 3A and 3B are a bottom view and a sectional view of the shut device shown in FIG. 1 illustrating the shut device in a state of opening.
Figure 3A:
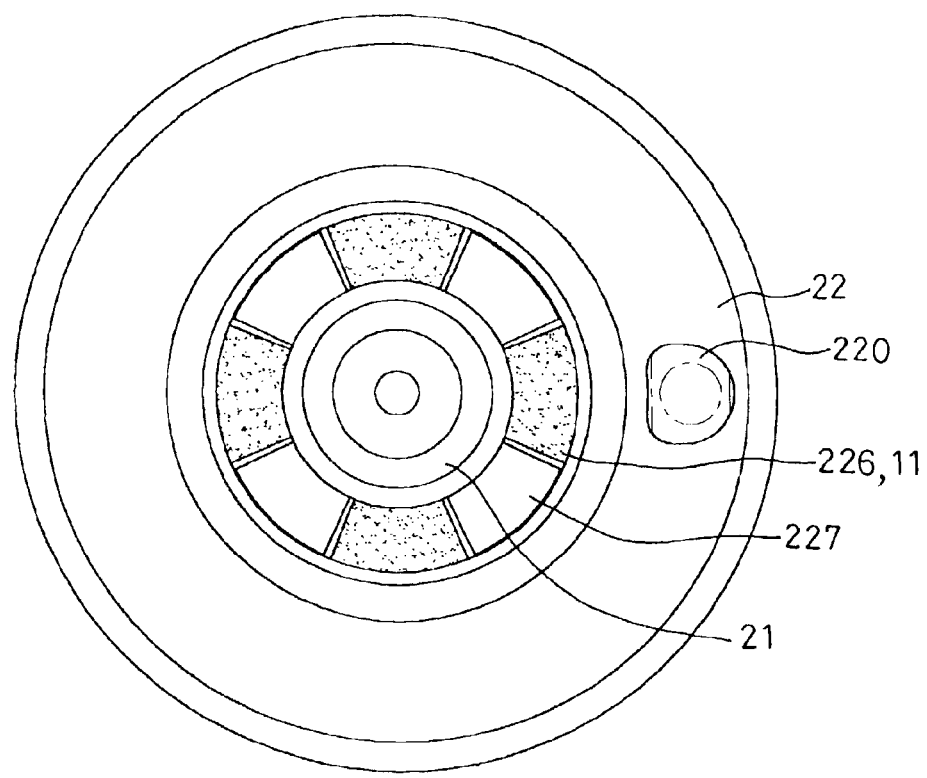

The rotary part 22 is a step shaped cap with a projecting fitting ring 221 corresponding to the two arctic curved walls 211 so that the rotary part 22 can fit with the curved walls 211 and the top thereof keeps contact with the circumference of the discharge outlet 11 and supported with the support wall 213. In order to form an effect of being rotationally located in place, the fitting ring 221 at the annual face thereof is provided with L-shaped guide grooves 222 and three positioning projections 223, 224 and 225 in accordance with three locating points, i.e., opening, shutting and detaching. Thus, hollow openings 226 and stop pieces 227 are alternately provided corresponding to the discharge outlet 11 such that the ground powder can pass through the hollow openings 226 via the discharge outlet 11 or the hollow openings 226 can be closed with the stop pieces 227 to prevent the powder from falling outward during being ground or staying in the grinder. Besides, the fitting ring 221 is provided with a protruding stopper 228 corresponding to the spacing 214 and it means the stopper 228 passes over the positioning projection 225 to have the tenon 212 aligning with the indentation 222 at the opening thereof during the protruding stopper 228 touching the curved wall 211 disposed at the left side such that the tenon 212 is detached from the indentation 222. When protruding stopper 228 touches the curved wall 211 disposed at the right side, it means the protruding stopper 228 passes over the positioning projection 223 such that the hollow openings aligns with the discharge outlet 11 and it forms a state of opening (as shown in FIGS. 3A and 3B). Further, when the tenon 212 falls between the positioning projections 224, 225, it means the stop piece 227 aligning with the discharge outlet 11 and it forms a state of closing (as shown in FIGS. 2A and 2B).

As the foregoing, the shut device 2 can be applied to any types of conventional grinders but in order to comply with U.S. Pat. No. 5,865,384 owned by the present invention, the rotary part 22 is provided with a knob hole 229 corresponding to a knob of a adjusting device disposed at bottom center of the discharge outlet so as to allow the knob extending outward. Besides, a light hole 220 is provided to correspond to the light bulb of the lighting device such that the light hole 220 can align with the light bulb exactly and light source can pass through the light hole 220 and project to articles such as food during the hollow openings 226 being opposite to the discharge outlet. Meanwhile, the grinder can be actuated as soon as the switch is pressed down and it means the stop pieces 227 close the discharge outlet during the light source is very much dim.

It is appreciated that the hollow openings can align with the discharge outlet of the grinder and the grinded powder can fall downward once the shut device of the present inventor is mounted to the discharge outlet at the bottom of the grinder and the rotary part is operated under control. Next, the stop pieces can close the discharge outlet to resist the powder disposed between the discharge outlet and the fitting ring with convenient operation. Besides, the shut device of the present invention can be associated with the grinder smoothly as an integral piece so that it is not possible to cause a visual abruptness to our eyes. Further, it is easy for the rotary part being attached to or detached from the stationary part quickly so that the shut device of the present invention can be cleaned with facility to avoid the deficiency of being unable to detach and clean resided in the conventional axial type cap mounted to the grinder.

While the invention has been described with reference to the a preferred embodiment thereof, it is to be understood that modifications or variations may be easily made without departing from the spirit of this invention, which is defined by the appended claims.

What is claimed is:

1. A shut device for a discharge outlet in a grinder located on a bottom of the grinder comprising:

a stationary part having first and second curved walls located on opposing sides thereof and each of the first and second curved walls has a tenon protruding inwardly on an interior surface; and a rotary part being a step-shaped cap with an abrupt fitting ring corresponding to the first and second curved walls so as to fit with the first and second curve walls such that a top of the fitting ring contacts with a discharge outlet at a circumference thereof, having an annular surface with two L-shaped guide grooves corresponding to the two tenons so that the tenons are inserted into the guide grooves to form an engagement respectively, having a plurality of hollow openings and stop plates being alternately positioned at a center thereof to correspond with three locating points of opening, shutting and detaching from the discharge outlets and three positioning projections being provided on the guide grooves in accordance with the three locating points;

whereby, once the rotary part is turned, the tenons move along the guide grooves and engage with the locating points one at a time respectively such that the hollow openings align with the discharge outlet for ground powder falling down or the stop plates close the discharge outlet preventing the powder from falling down.

2. The shut device for a discharge outlet in a grinder as defined in claim 1, wherein a third curved wall is concentrically located between the first and second curved walls with a height thereof shorter than the first and second curved walls for supporting the fitting ring.

3. The shut device for a discharge outlet in a grinder as defined in claim 1, wherein a spacing is arranged between the first and second curved walls to receive and limit a protruding stopper extending laterally from the fitting ring and the stopper touching either one of the first and second curved walls stands for the hollow opening aligning with the discharge outlet or the tenons aligning with the guide grooves.

4. The shut device for a discharge outlet in a grinder as defined in claim 1, wherein the stationary part is provided with a knob hole corresponding to a knob on a adjustment device of the grinder for the knob extending through.

5. The shut device for a discharge outlet in a grinder as defined in claim 1, wherein the stationary part is provided with a light hole corresponding to a light bulb on a lighting device of the grinder for a light source projecting through the light hole.

* * * * *